United States Patent [19]
Jacobs et al.

[11] Patent Number: 5,958,072
[45] Date of Patent: Sep. 28, 1999

[54] COMPUTER-SYSTEM PROCESSOR-TO-MEMORY-BUS INTERFACE HAVING REPEATING-TEST-EVENT GENERATION HARDWARE

[75] Inventors: Edward M. Jacobs, Mountain View; Kent A. Dickey, Sunnyvale; Kathleen C. Nix, San Jose, all of Calif.

[73] Assignee: Hewlett-Packard Company, Palo Alto, Calif.

[21] Appl. No.: 08/782,964

[22] Filed: Jan. 13, 1997

[51] Int. Cl.[6] .............................. G06F 11/00; G06F 12/16; G06F 13/00
[52] U.S. Cl. .............................. 714/30; 711/118; 714/42; 714/703; 714/718
[58] Field of Search ........................... 711/118; 371/21.1, 371/40.11, 40.2, 3; 395/183.06, 183.18; 714/30, 42, 703, 718, 763, 764

[56] References Cited

U.S. PATENT DOCUMENTS

| | | | |
|---|---|---|---|
| 4,891,809 | 1/1990 | Hazawa ................................... | 714/703 |
| 5,233,616 | 8/1993 | Callander ................................ | 714/764 |
| 5,649,090 | 7/1997 | Edwards et al. ........................ | 714/54 |
| 5,668,815 | 9/1997 | Gittinger et al. ....................... | 714/720 |

*Primary Examiner*—Glenn Gossage

[57] ABSTRACT

A processor-to-memory interface (PMI) for a multiprocessor computer system and a computer testing method are disclosed. The multi-processor computer system provides a processor-to-memory-bus interface for each microprocessor. Each processor-to-memory-bus interface translates between microprocessor and bus protocols and manages respective level-2 (L2) caches. In addition, each interface includes test-event hardware that, when enabled causes test events to be generated with a predetermined repetition rate. The test events are selected for having a non-zero probability of causing system events that are complex, rare and non-fatal. These include assertions of "busy" and "wait" conditions and corrections of single-bit cache errors. The test-event hardware includes a timing generator that determines when test events are to be generated, an event-flag register that determines which events are to be generated, and a test-event generator that generates test-events at the times determined by the timing generator. The timing generator can include a down counter and a register for holding a value to be entered into the counter upon initialization and reset. So that cache error-correction logic can be tested, a cache manager includes a cache-error generator that can generate cache errors at times determined by said timing generator. The test-event hardware permits system events of interest to be repeatedly generated during a test procedure without repeated intervention by a test program. The hardware test-event generation simplifies test program design and allows faster testing throughput.

11 Claims, 4 Drawing Sheets

COMPUTER-SYSTEM PROCESSOR-TO-MEMORY-BUS INTERFACE HAVING REPEATING-TEST-EVENT GENERATION HARDWARE

BACKGROUND OF THE INVENTION

The present invention relates to computer systems and, more particularly, to computer systems with built-in test hardware. A major objective of the present invention is to improve testability of complex computer systems.

Much of modern progress is associated with advances in computer technology. Computer performance has roughly doubled every eighteen months for over a decade, and the best estimates are that this pace will be sustained for years to come. Most of the performance increases have been due to improvements in semiconductor manufacturing technology, which have allowed microprocessors and memory to be built with smaller circuit elements and faster speeds.

In addition, developments in parallel processing, microprocessor architecture, and memory architecture have also contributed significantly to the performance increases. Increasing numbers of computers use multiple processors to permit parallel processing to exceed the performance limits imposed on von Neuman architecture (one-instruction-at-a-time) machines. Modern microprocessors include multiple execution units, permitting parallelism within single processors. Memory architectures have provided multi-level memory systems in which relatively large-but-slow memory holds the bulk of the data and the instructions used by a microprocessor, while relatively small-but-fast cache memory holds frequently used memory items.

Both microprocessor architecture and memory architecture have evolved to yield the now typical two-level cache architecture: a relatively small-but-fast level-1 (L1) cache is built into the microprocessor, while a relatively large-but-slow level-2 (L2) cache is external to the microprocessor. (The L2 cache is still smaller and faster than main memory.)

A typical modern high-performance computer can include multiple microprocessors, each with an internal L1 cache and an associated L2 cache. The microprocessors communicate with each other, with main memory, and with peripherals over a communications bus. The communications bus has an associated communications protocol. Associated with each microprocessor is a processor-to-memory-bus interface (more commonly referred to as a "processor-to-memory interface" or "PMI") that translates between the microprocessor protocol and the bus protocol. Conveniently, the interface can also serve as a L2 cache manager.

Testing is a major concern for computer manufacturers. Testing is used to assist computer design and development, to ensure quality of manufactured units before shipping, and to help diagnose problem units. Many computer problems arise only under very specific circumstances, which may be hard to determine. The number of possible computer states that should be considered in a test increases dramatically according to the complexity and number of microprocessors in a system. One of the challenges of testing is to test event combinations that include rare events such as error conditions and interruptions.

Many computers include hardware that permits indications of normally rare events to be generated under the control of a test program while the system is in a test mode. Depending on the test hardware provided, the event indications can be simple or complex to generate. In either case, it is not practical to generate the test program code to adequately test a sufficient fraction of possible event combinations for development, quality assurance, and diagnostic purposes. Furthermore, running such a comprehensive test program can be very time consuming.

To the extent that some rare events are more difficult to generate than other events, a test program might favor testing the latter. More generally, all test programs reflect some presumptions as to what event combinations must be tested and which can be omitted. A test program can be designed so that test parameters can be entered by a tester, but such flexibility adds another level of complexity to the testing program.

To simplify test programs and their development and to increase the rate at which testing occurs, what is needed is a system that allows more testing to be done in a shorter time with less test program code. Preferably, such a system would facilitate testing of event combinations with at least some rare events.

SUMMARY OF THE INVENTION

The present invention provides a processor-to-memory-bus interface (PMI) with test-event hardware for repeatedly generating selected system events without repeated intervention by a test program. The PMI includes a microprocessor interface for communicating with a respective microprocessor, a bus interface for communicating with a system bus, and a translation function for translating between the protocols of the microprocessor and the bus.

The test-event hardware includes a test-event generator, a test-event selector, and a timing generator. The test-event generator has the capability of generating events of any of a set of test-event types; examples of test-event types are emulations of microprocessor "busy" indications and commands to introduce single-bit data errors during a cache write. The test events are selected to have a non-zero probability of causing system events of interest. Where the test-event is itself a system event, the probability is unity. In the case of a cache write error, the system event would be the correction of the error—however, this correction would only occur if and when the item containing the error is read from cache. In this case, the probability is less than unity.

The test-event selector determines which types of test events are to be generated. The test-event selector can include an event-flag register which includes a flag bit for each type of test event that can be generated. Each flag bit indicates whether or not the respective test event is selected for generation. The flag bits can be coupled to respective enable inputs of the test-event generator.

The timing generator determines when the selected test events are to be generated. For example, the timing generator can generate a trigger signal that triggers event generation by the test-event generator. The timing generator can include a down counter and a register for holding a value to be entered into the counter upon initialization and reset. Each clock cycle can result in a decrement of the counter. When the counter reaches zero, a trigger signal is transmitted and the counter is reset to the register value. Thus, the timing signal is generated repeatedly without intervention of the test program. However, a test program or utility can be used to set the flag and count registers initially.

The timing generator can be driven by a system clock (e.g., received at the counter clock input). This results in periodic generation of the select test events. Even in this case, the test-event generation is likely to occur on a pseudo-random basis relative to the operation of a test program. Alternatively, the count register can be varied automatically (e.g., by allowing some bits of low significance to vary with unrelated data values) to provide a more random occurrence of the test events.

If more systematic test-event generation is desired, the timing input to the timing generator can be an event (other than a clock transition) of interest. For example, it may be desirable to generate a "wait" indication by the local microprocessor once every twenty times a "wait" indication is being asserted by another microprocessor to check if the system handles such a concurrence of events properly. If an event or combination of events of interest does not generate an appropriate signal, then an event detector can be used to detect events or event combinations; in response to such a detection, the event detector would generate the appropriate signal for driving the timing generator.

When the timing generator is driven by a clock signal, the repetition rate for the test-generation hardware can be indicated in units of repetitions per unit time. When the timing generator is driven by some other events, the repetition rate can be indicated in units of repetitions per number of instances of some event or combination of event. In either case, the rate can be selected by entering a value in the count register. In addition, the repetition scheme can provide for random variation in the repetition rate.

A corresponding method of the invention begins with enabling of the test-event hardware. An initialization program then programs the timing generator and the event-flag register to select the event-types to be generated and the repetition rate. A test program—which can be an applications program not specifically designed for testing—is then run. As the program is running, the test-event hardware generates the selected test events at the selected repetition rate. As a result, the corresponding system events of interest are repeatedly generated.

The PMI can include a cache manager for managing a cache. The cache manager includes logic for determining when an item in memory is also represented in the cache and for determining at which cache locations new cache items are to be stored. The cache manager includes error-correction logic for encoding an item to be stored in cache in error correction code. The cache manager also includes a cache-error generator for generating single-bit errors in ECC encoded items written to the cache.

The cache-error generator is functionally between the cache manager and the cache so that errors can be controllably introduced into cache contents, including tags and data/instructions. The test-event generator can transmit commands indicating when such single-bit errors are to be introduced.

This cache manager provides a method for checking error-correction logic and its system-wide effects. The method begins with encoding an item being written to a cache in error correction code. Commands are issued to introduce a single-bit error in the encoded item. The error can then be corrected by the error-correction logic upon a read of the item from cache.

A major feature of the invention is the repeated generation of a test-event or a combination of test-events without repeated intervention of a test program. This allows the test program to be developed without code specifically directed to generating the test events that are able to be generated or "generatable" in hardware. This simplifies test program design and coding. In addition, the test program need not attend to generation of test events that the hardware can generate; the test program can run uninterrupted sequences of instructions, increasing testing throughput.

Furthermore, the test-program need not be a program specifically designed for testing. The operating system or an applications program can be run in test mode while the test-event hardware generates rare events that might be causing the operating system or program to crash under normal operation. Thus, the present invention facilitates diagnoses of problems that occur with any given combination of hardware and software.

Finally, since the test-event hardware generates test-events on a pseudo-random basis relative to the test program operation, some biases regarding event combinations of interest built into the test program can be overcome. This can lead to detection of system problems that might go undetected by a test program alone. These and other features and advantages of the invention are apparent from the description below with reference to the following drawings.

DESCRIPTION OF THE PREFERRED EMBODIMENTS

Figure 1:
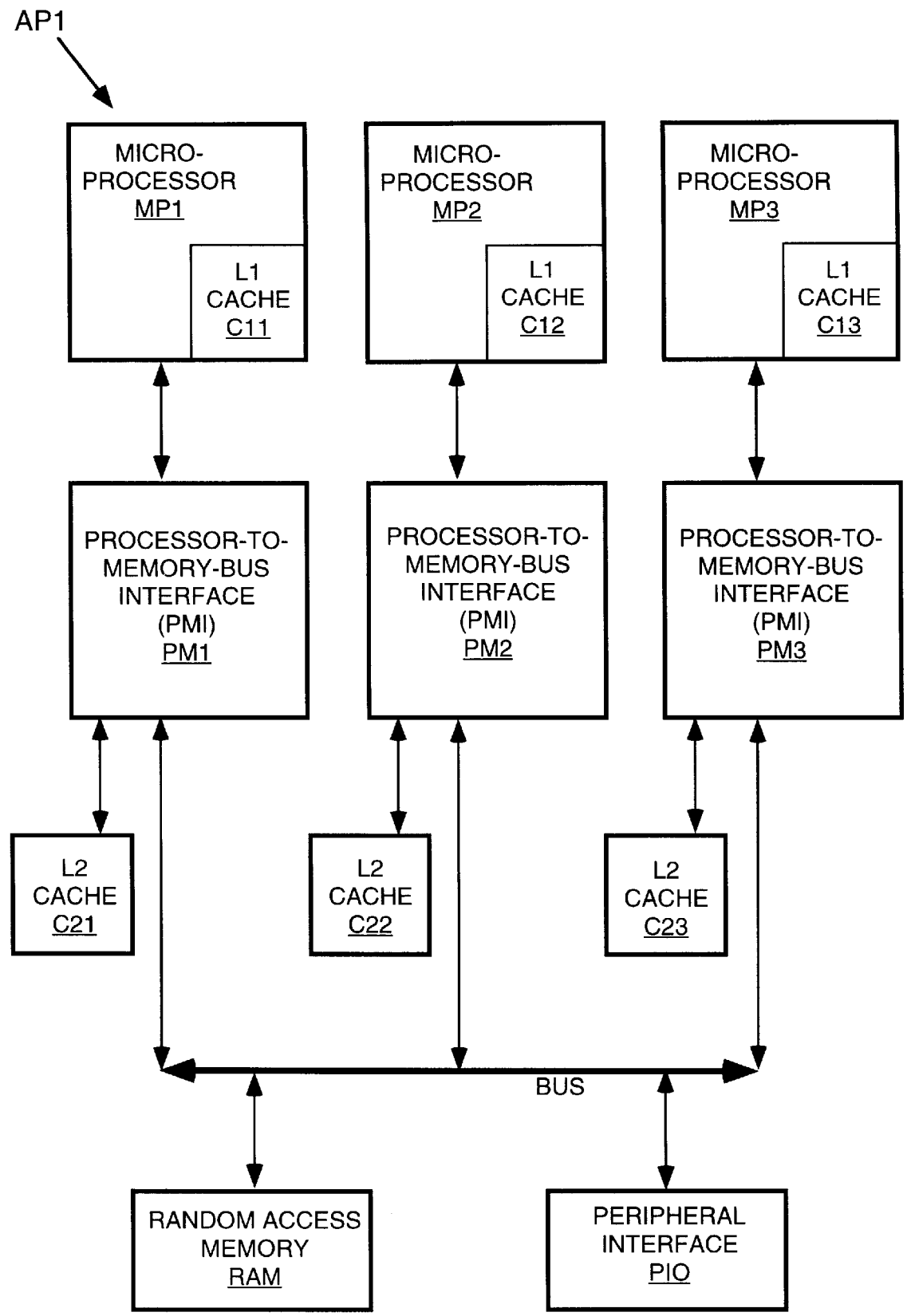
FIG. 1 is a block diagram of a computer system incorporating test-event generation hardware in accordance with the present invention.

As shown in FIG. 1, a symmetric multiprocessing computer system AP1 according to the present invention comprises three microprocessors MP1, MP2, and MP3, respective PMIs PM1, PM2, and PM3, respective L2 caches C21, C22, and C23, a system bus BUS, random access memory RAM, and a peripheral interface PIO. Each microprocessor includes a respective L1 cache C11, C12, and C13. Each microprocessor operates according to a coherent microprocessor protocol.

PMIs PM1, PM2, and PM3, memory RAM, and peripheral interface PIO are coupled directly to bus BUS. System bus BUS has an associated system bus protocol. Memory RAM includes a controller that conforms to the bus protocol. Peripheral interface PIO translates between the system bus protocol and any attached peripherals. Each PM1 provides the necessary translation between the protocol of its respective microprocessor and the bus protocol.

Figure 2:
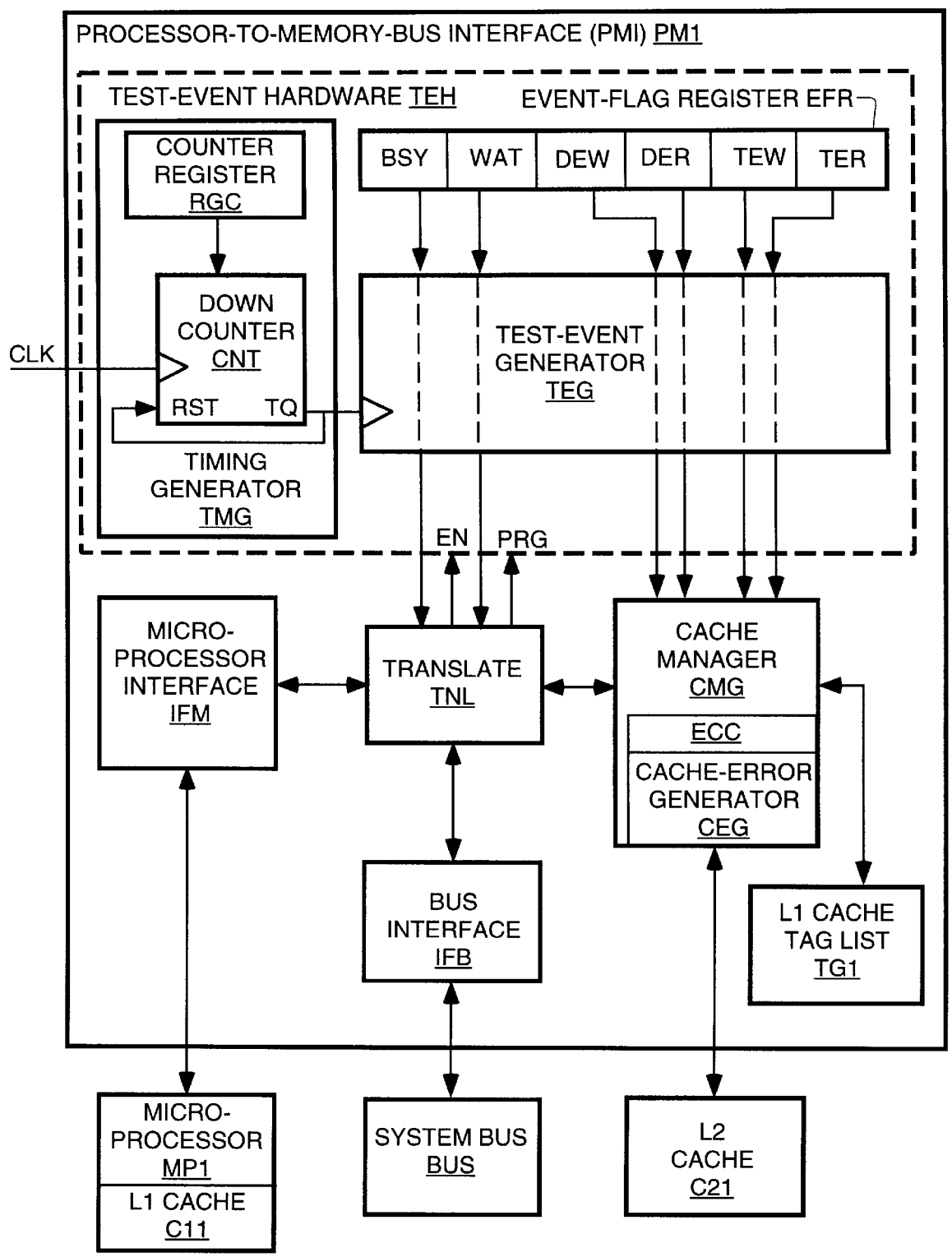
FIG. 2 is a block diagram detailing a processor-to-memory-bus interface of the system of FIG. 1.

The three PMIs are nominally identical so that the structure of all three is understood with reference to the following description of PMI PM1. As shown in FIG. 2, PMI PM1 includes a microprocessor interface IFM, a bus interface IFB, translation function TNL, a cache manager CMG, a duplicate L1 tag list TG1, and a test-event hardware TEH. Bus interface IFB provides for communication between system bus BUS and PMI PM1. Microprocessor interface IFM provides for communication between microprocessor MP1 and PMI PM1. Translation function TNL is coupled to both interfaces to translate between the microprocessor and bus protocols.

Cache manager CMG manages L2 cache C21 and L1 cache-tag list TG1. Duplicate L1 tag list TG1 maintains a copy of the L1 tags used in microprocessor MP1. When another microprocessor needs to check caches for modified data, duplicate list TG1 saves time and effort involved in checking L1 cache C11. Cache manager CMG includes error-correction (code) logic ECC that corrects single-bit data/instruction and tag errors in L2 cache C21; more radical cache errors are detected, but not corrected.

In accordance with the present invention, cache manager CMG also includes a cache-error generator CEG. In response to commands from test-event hardware TEH, cache-error generator CEG can introduce any combination of four single-bit error types: 1) a data-write error DWE (applies to data and instructions); 2) a data-read error DRE (applies to data and instructions); 3) a tag-write error TWE; and 4) a tag-read error TRE. To avoid unrecoverable two-bit cache errors, single-bit data errors are introduced at the same bit position for both reads and writes for error types DRE and DWE. For the same reason, tag-errors TWE and TRE are applied to the same tag-bit positions.

In an alternative computer system, the error-correction logic is more sophisticated. While it does not correct double-bit errors directly, it can initiate a search for a clean copy of the erroneous data outside of the cache. To test the operation of such error-correction logic, it is desirable to provide for double-bit errors. This can be achieved by using different bit positions for single-bit read and write errors. Alternatively, provision can be made for double-bit errors to be entered either during a cache read or a cache rite.

Cache-error generator CEG is functionally between error-correction logic ECC and L2 cache C21 so that it can be used to check the validity of error-correction logic ECC as well as determine how system AP1 handles event combinations including a multi-bit cache error. Error types DRE and TRE generate errors during a cache read that are detected by error-correction logic as soon as they are generated. Errors of types DWE and TWE are introduced as data is being written—these errors are detected, if at all, only when the erroneous data is read. The latter case introduces an additional level of pseudo-randomness to the test procedure. Depending on the testing situation, this additional randomness may or may not be desirable. A tag error and a data error can be generated concurrently.

Test-event hardware TEH comprises a timing generator TMG, an event-flag register EFR, and a test-event generator TEG. Six-bit event-flag register EFR provides for selection of the event types to be generated during a test procedure. Each bit position corresponds to a respective test-event. Event-flag register EFR is programmable by a test-initialization program so that the events to be generated repeatedly can be selected. Preferably, the test-initialization program allows tester input in selecting test events and the count used in generated timing signals. Each bit is coupled to test-event generator TEG to enable the generation of the corresponding test event.

Timing generator TMG of test-event hardware TEH determines when selected test events are to be generated. Timing generator TMG includes a 12-bit software-programmable count register RGC and a down counter CNT. Upon a software initialization command and upon reset, down counter CNT loads the value stored in count register RGC. At each upward transition received at its clock input, counter CNT decrements its value. When the count reaches zero, down counter CNT generates a timing signal and resets itself to the value in register RGC. When the timing signal is generated, enabled events are generated in response to the timing signal. Disabled events, as determined by event-flag register EFR, are not generated.

In system AP1, the clock input of counter CNT is driven by a system clock signal. Accordingly, the enabled test events are generated periodically, irrespective of the activity of a running test program. If more random timing is desired, the count in register RGC can be varied. Variations can be achieved without program intervention by allowing some low-significance bits of counter register RGC to vary as a function of some unrelated activity. For example, selective bits of each line written to L2 cache C21 could be introduced into the selected low-significance bits of counter register RGC.

In other cases, it might be desirable to synchronize a test event with another system event or combination of system events. For example, one might want to determine the effect of two microprocessors asserting busy signals at about the same time. Where the system event of interest has the proper signal form, it can be input to the timing generator instead of a clock signal. Where the event does not have such a form or where a combination of events is to be used to trigger a count decrement, an event detector can be used to detect the trigger event or event combination and output the appropriate trigger signal. Thus, the invention provides for a variety of signals to drive the timing generator of the test-event hardware.

Test-event generator TEG generates test events of the types indicated as selected by event-flag register EFR at the times indicated by timing generator TMG. In the case that the "wait" test-event type is enabled, test-event generator TEG generates a signal that emulates a "wait" signal that microprocessor MP1 can generate. Translation function TNL translates this emulation signal, as appropriate, to a "wait" signal conforming to the bus protocol. An enabled "busy" test-event type results in an analogous sequence of events. When enabled, cache-error event types result in commands to cache manager CMG for its cache-error generator CEG to generate one or more indicated cache-error types.

Figure 3:
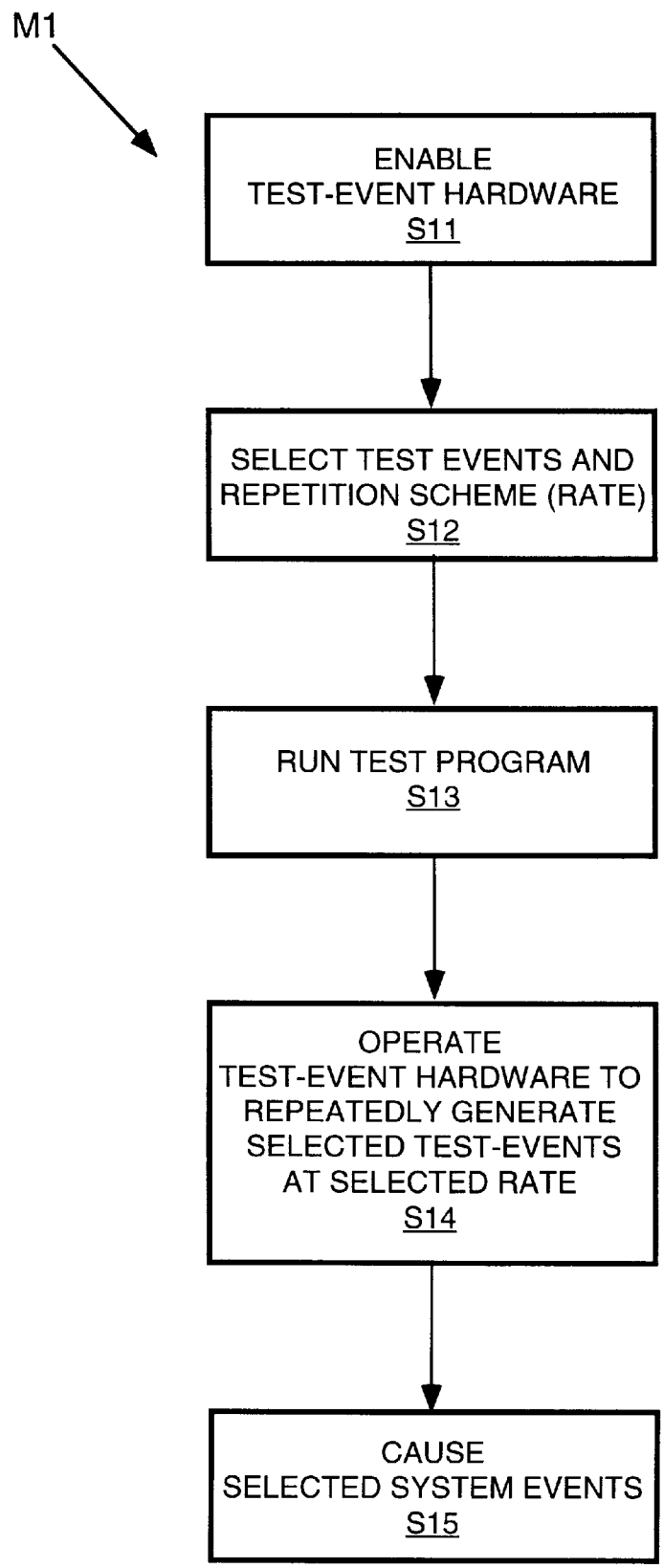
FIG. 3 is a flow chart of a system test method of the invention implemented on the system of FIG. 1.

A method M1 of the invention, flow charted in FIG. 3, can be implemented on system AP1. During normal operation, the enable input EN of test-event hardware TEH is held low by translation function TNL so that no test events are generated. Emulations of system events are not generated. Commands to introduce cache errors are not generated. Accordingly, cache data flows between error-correction logic ECC and L2 cache C21 without the intentional introduction of errors. In other words, in the absence of cache-error commands, data passes through cache-error generator CEG unchanged.

At step S11, test-event hardware TEH is enabled. To this end, a test program or a dedicated test-event hardware initialization program can provide instructions to microprocessor MP1 that result in an enable command being conveyed through microprocessor interface IFM to translation function TNL. Translation function TNL asserts an active enable signal to test-event-hardware enable input EN.

At step S12 and while test-event hardware TEH is enabled, the initializing program instructs microprocessor MP1 to transmit initialization data. This data is forwarded by translation function TNL to the test-event-hardware program input PRG. This data is routed, as appropriate, to event-flag register EFR to determine which event types are enabled and which are not, and to count register RGC to determine the repetition rate for event generation.

At step S13, and while test-event hardware TEH is enabled, a test program is run. The test program can be a continuation of the program used to initialize test-event hardware TEH. Alternatively, the test program can be separate from a dedicated test-event-hardware initialization program. In the latter case, the test-program designer can develop test code without regard to test-event hardware TEH. Yet, the tester using the test program can take advantage of test-event hardware TEH. Moreover, the test program need not be a program designed for testing. An operating system or an application program can be run with test-event hardware TEH initialized and enabled to assist diagnoses of system programs that occur primarily in the context of a particular application program. The "test program" can be whatever program is run while the system is in test mode.

At step S14, with test-event hardware TEH enabled and the test program running, events of the types selected at step S12 are generated repeatedly at the rate set at step S12. If timing generator TNG is driven by a clock signal, the rate is measured in repetitions per unit time. If timing generator TMG is driven by a non-periodic event or combination of events, the rate can be measured in repetitions per event occurrence. In either case, the repetitions occur without further program intervention.

At step S15, the system events corresponding to the generated test events are generated with non-zero probability. Emulated microprocessor "busy" and "wait" signals result in real bus "busy" and "wait" signals when these can be legally generated. Cache-error commands result in cache error detections and corrections, unless a cache item including an induced error is not read.

The test events are selected to have a non-zero probability of causing system events—i.e., events that occur intentionally during normal (non-test) operation of a computer system. In system AP1, the test-events are not system events. However, the generated "wait" and "busy" indications are emulations of indications that can be generated by microprocessor MP1. Translation function TNL translates these into "wait" and "busy" bus signals to test the reaction of microprocessors MP2 and MP3 to such bus signals more frequently than would occur without test-event hardware TEH. In an alternative system, the test-event hardware could be used to generate the "wait" and "busy" bus signals directly. More generally, signals indicating that a microprocessor is not ready to do something are suitable candidates for test events.

Figure 4:
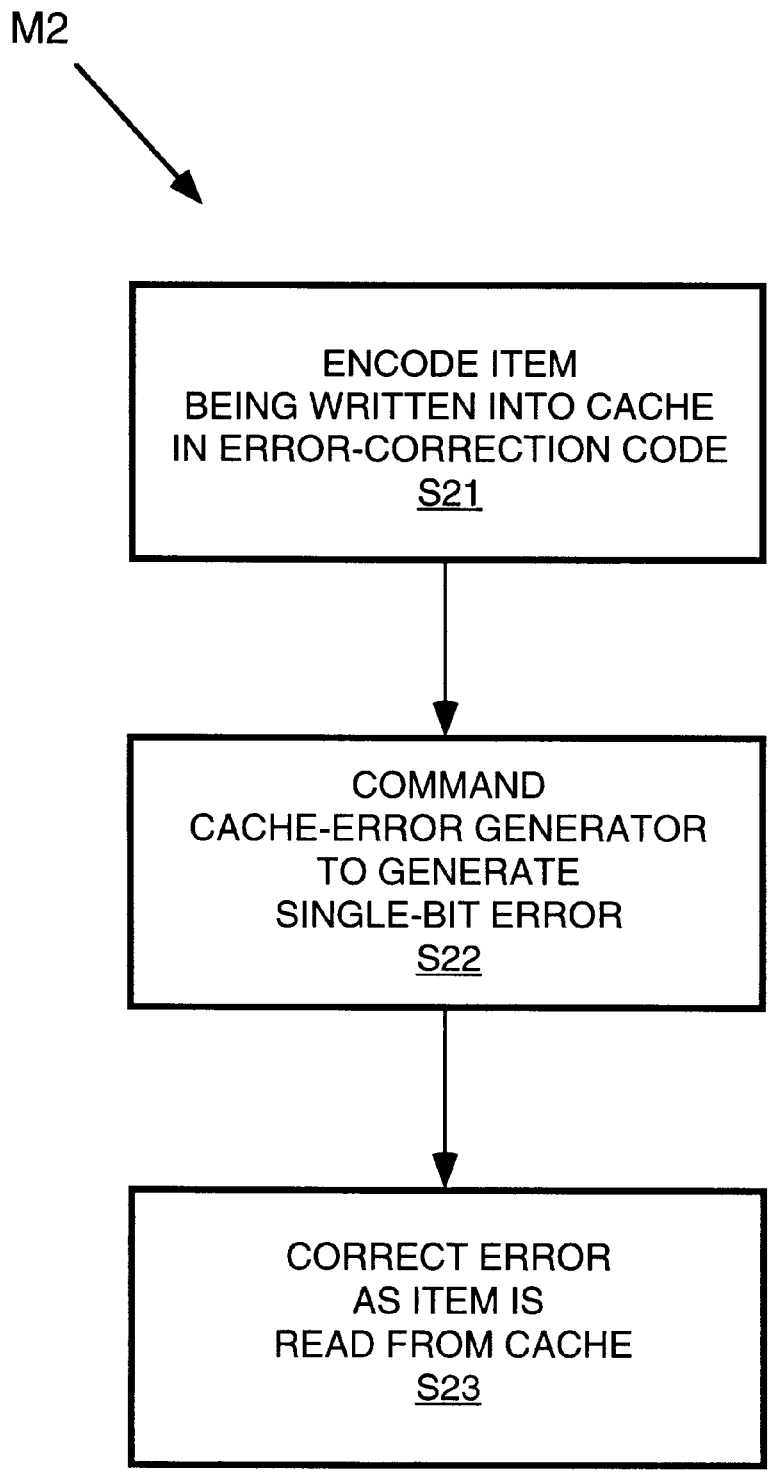
FIG. 4 is a flow chart of an error-correction logic test method of the invention implemented on the system of FIG. 1.

With respect to cache error-correction logic, the invention provides a method M2, flow charted in FIG. 4. Step S21 involves error-correction logic ECC encoding an item to be written to cache in error-correction code. The item can include data and a tag; "data", as used here, includes program instructions. At step S22, test-event generator TEG transmits commands to command inputs of cache-manager CMG for cache-error generator CEG to generate an indicated single-bit error in the encoded item. Error-correction logic ECC then corrects the item if and when it is read. In this way, the error correction logic and the effects of error correction system wide can be tested with greater frequency than would be the case without the repeated introduction of single-bit cache errors.

Generally, the system events embodied, emulated or commanded by the test events are typically rare events that require special handling; the events of interest can vary from system to system. The advantages of the invention are not fully realized for events that: 1) are very unlikely to cause any problems even in combination with other events; 2) occur so rarely that they are not of practical concern; and 3) will inevitably cause the system to stop operating. For an example of the first type, a parity error in L1 cache list TG1 might be rare, but pose no problem as far as system operation is concerned. A three-bit cache error would be an example of both the second type and the third type. Three-bit cache errors are extremely rare; in addition, detection of a three-bit error can shut down system AP1. There is no point in providing for unattended multiple occurrences since system AP1 would have to be rebooted between occurrences.

In the illustrated embodiment, types of special events are provided for: "busy", "wait", L2 cache data-write error, L2 cache data-read error, L2 cache tag-write error, and L2 tag-read error. In another preferred embodiment of the invention, only "busy", "wait" and L2 cache tag write errors are provided for. In another embodiment, L1 cache tag read errors and L1 tag write errors are provided for.

In the illustrated embodiment, microprocessor MP1 and PMI PM1 are on different integrated circuits. However, in some alternative embodiments, a PMI can reside on the same integrated circuit as the microprocessor. In that case, the test-event hardware could generate errors in the L1 cache.

While the invention is illustrated in the context of a symmetric multiprocessing system, single-processor and asymmetric multiprocessing systems are also provided for. These can include nominally single-processor systems with bus peripherals that include dedicated microprocessors serving as controllers. These and other variations upon and modification to the described embodiments are provided for by the present invention, the scope of which is limited only by the following claims.

What is claimed is:

1. A processor-to-memory-bus interface for a computer system having a microprocessor, memory, and a bus over which transfers between said microprocessor and said memory occur, said microprocessor implementing a microprocessor protocol, said bus implementing a bus protocol, said interface comprising:

a microprocessor interface for communicating with said microprocessor;

a bus interface for communicating with said bus;

test-event hardware coupled to said microprocessor interface and said bus interface, said test-event hardware, including a test-event generator for generating test events of plural test-event types, each event of each test-event type having a non-zero probability of causing a system event of interest, a timing generator for repeatedly generating timing indications, each timing indication indicating a time when test-events of selected test-event types are to be generated, and a test-event selector for selecting the selected test-event types from said plural test-event types so that test events of the selected test-event types are generated for each of said timing indications.

2. A processor-to-memory-bus interface as recited in claim 1 wherein said plural test events include an event indicating said microprocessor is not ready to execute some operation.

3. A processor-to-memory-bus interface as recited in claim 1 further comprising a cache manager for managing a cache, external to said processor-to-memory-bus interface, for storing data, said test-event hardware further including a cache-error generator for generating errors in said data as it is communicated to or from said cache.

4. A processor-to-memory-bus interface as recited in claim 1 wherein said timing generator includes a down counter and a register for holding a value to which said down counter is to be reset when one of said timing indications is generated.

5. A processor-to-memory-bus interface as recited in claim 1 wherein said test-event selector includes an event-flag register having a bit corresponding to each of said plural test events.

6. A computer testing method comprising the steps of:

enabling test-event hardware of a processor-to-memory-bus interface for a system including a system bus, a microprocessor communicating with said bus via said interface, and memory coupled to said interface via said bus;

programming said test-event hardware so as to select at least some of a set of test event types generatable by a test-event generator of said test-event hardware and so as to select a repetition scheme for a timing generator of said test-event hardware, each of said test-event types having a non-zero probability of causing a respective system event of interest;

running a test program; and operating said test-event hardware so that test events of the selected test-event types are repeatedly generated according to said repetition scheme while said test program is running and so that the respective system events are repeatedly generated.

7. A method as recited in claim 6 wherein said test-event types include emulations of events indicating said microprocessor is not ready to execute some operation.

8. A method as recited in claim 6 wherein said test-event types include introduction of errors in data being transferred between a cache manager and a cache of said system.

9. A method as recited in claim 6 wherein, in said programming step, the selection of said repetition scheme involves loading a count value corresponding to said repetition scheme into a register.

10. A method as recited in claim 6 wherein said programming step involves setting flags in an event flag register, each flag indicating whether or not a respective one of said test-event types is selected.

11. Test-event hardware for testing an incorporating system capable of generating system events, said test-event hardware comprising:

a test-event generator for generating test events of plural test-event types, each event of each test-event type having a non-zero probability of causing a system event of interest;

a timing generator for repeatedly generating timing indications, each timing indication indicating a time when test-events of selected test-event types are to be generated; and a test-event selector for selecting the selected test-event types from said plural test-event types so that test events of the selected test-event types are generated for each of said timing indications.

* * * * *